United States Patent [19]

Ito

[11] 4,182,291
[45] Jan. 8, 1980

[54] DASHPOT WITH FAST IDLE DEVICE FOR CARBURETOR THROTTLE

[75] Inventor: Tomo Ito, Katuta, Japan

[73] Assignee: Hitachi, Ltd., Japan

[21] Appl. No.: 851,693

[22] Filed: Nov. 15, 1977

[30] Foreign Application Priority Data

Dec. 1, 1976 [JP] Japan ................... 51-143433

[51] Int. Cl.$^2$ ................................. F02D 11/08
[52] U.S. Cl. ........................... 123/103 R; 123/103 B; 123/103 E; 123/DIG. 11; 137/489; 251/61.4; 261/DIG. 18
[58] Field of Search ............. 123/97 B, 103 R, 103 B, 123/103 C, 198 DB, 103 E, DIG. 11; 261/DIG. 18, DIG. 19; 137/489; 251/61.4, 357

[56] References Cited

U.S. PATENT DOCUMENTS

| | | | |
|---|---|---|---|
| 3,327,695 | 6/1967 | Rhodes | 261/DIG. 18 |
| 3,373,765 | 3/1968 | McCarty | 137/489 |
| 3,730,153 | 5/1973 | Harrison et al. | 123/DIG. 11 |
| 3,744,470 | 7/1973 | Clarke et al. | 123/DIG. 11 |
| 3,881,685 | 5/1975 | Hase et al. | 261/DIG. 18 |
| 3,996,904 | 12/1976 | Kobuki et al. | 123/103 R |
| 4,051,823 | 10/1977 | Mogi et al. | 123/97 B |
| 4,060,063 | 11/1977 | Hirasawa | 123/198 DB |

FOREIGN PATENT DOCUMENTS 2248417 6/1975 France ................... 123/103 R

*Primary Examiner*—Charles J. Myhre
*Assistant Examiner*—Craig R. Feinberg
*Attorney, Agent, or Firm*—Craig and Antonelli

[57] ABSTRACT

A dashpot with a fast idle device for carburetor throttles comprises a dashpot for damping a rapid closing movement of the throttle and a fast idle device for causing an automobile to run at fast idle. The fast idle device has a vacuum chamber separated from an air chamber of the dashpot by a partition, and a rod passing through a hole made in the partition, which rod is secured to a diaphragm defining a part of the vacuum chamber and axially moved with vacuum induced into the vacuum chamber. For sealing a gap defined between the rod and the partition, there is provided with a resilent seal member which is disposed in the air chamber of the dashpot and comprises a first portion engaged with an annular groove made in the rod so that the first portion will move in conformity with the axial movement of the rod, a second portion disposed around the gap and airtightly contacting with the partition, and a third portion extending from the first portion to the second portion and having a shape such that the second portion is pressed on the partition more tightly with the vacuum increasing. The seal member is shaped for example like a cup.

11 Claims, 4 Drawing Figures

DASHPOT WITH FAST IDLE DEVICE FOR CARBURETOR THROTTLE

BACKGROUND OF THE INVENTION

This invention relates to a dashpot with a fast idle device for carburetor throttles, particularly to a seal construction for sealing a gap defined between a vacuum chamber provided in the dashpot with the fast idle device and a rod passing through a hole made in a wall of the vacuum chamber.

The dashpot is for damping a rapid closing movement of the throttle, and the fast idle device is to cause an engine of an automobile equiped with for example a compressor for coolers to run at fast idle while the engine running is driving the compressor during stopping of the automobile. The dashpot with the fast idle device is the dashpot and the fast idle device operatively connected to each other. This kind of apparatus is shown for example in U.S. Pat. No. 3,618,582 and Japanese Publication of Pat. application No. 49-45246 (1974). They each have a vacuum chamber, a rod passing through a hole made in a wall of the vacuum chamber, and axially moved with vacuum induced into the vacuum chamber, and a seal member for sealing a gap defined between the rod and the wall of the vaccum chamber. The seal member used in the Japanese Publication No. 49-45246 is a bellows type. The bellows type seal member is not proper to be used in the presence of a large pressure difference, because it shrinks due to the pressure difference to clamp the rod so that the movement of the rod will be prevented. Therefore, the bellows type seal member needs a spring to be used for spreading the seal member. In the U.S. Pat. No. 3,618,582, an o-ring is used for sealing the gap. The o-ring is not proper to be used in a dry condition, further it has defects in its precise finishing and its durability.

In the drawing of Japanese Publication of Pat. application No. 50-35971 (1975), a construction resembling the present invention is shown, wherein two vacuum chambers are divided by a partition wall through which a plunger passes, and a bellows type seal member is provided for sealing a gap between the plunger and the partition wall. Pressure difference applied to the bellows type seal member seems to be small compared with that in the Japanese Publication No. 49-45246 (1974), so that an axial movement of the plunger may be free from it.

Further, in sealing constructions, there are an oil ring and a rolling diaphragm. The former, however, has the same defects as the o-ring, and the latter has defects that its construction is complicated and has a large hysteresis.

SUMMARY OF THE INVENTION

An object of the invention is to provide a dashpot with a fast idle device in which a gap between a wall of a vacuum chamber and a rod passing through the wall can be sealed effectively with a simple construction.

Another object of the invention is to provide a dashpot with a fast idle device which can be easily assembled.

Briefly stated, a feature of the present invention is in that a seal member for sealing a gap between a wall of a vacuum chamber and a rod passing through the wall is disposed in a higher pressure region than the vacuum chamber and comprises a first portion airtightly engaging with the rod so that the first portion can be moved in conformity with the axial movement of the rod, a second portion disposed around the gap and contacting with the wall, and a third portion extending from the first portion to the second portion and having a shape such that the second portion will be more tightly pressed on the wall as pressure difference applied to the seal member increases.

BRIEF DESCRIPTION OF THE PREFERRED EMBODIMENTS

Figure 1:
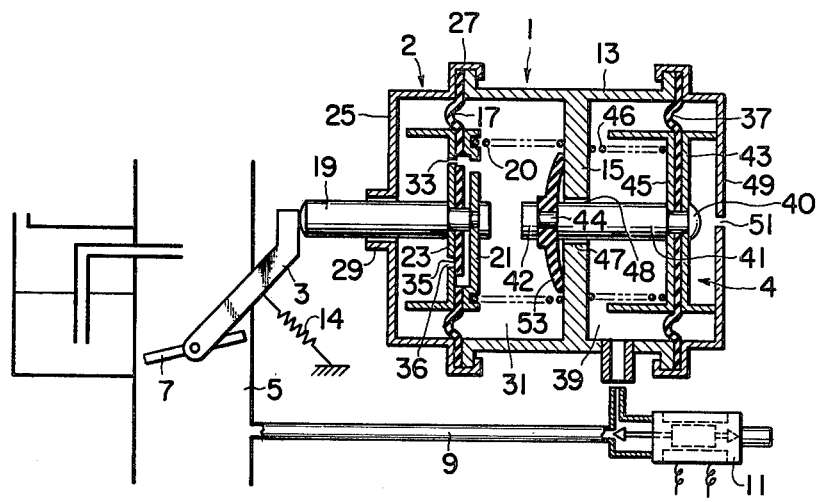
FIG. 1 is a section view of an embodiment of a dashpot with a fast idle device according to the invention.

Referring to FIG. 1, an embodiment of the invention will be described hereinafter in detail.

In FIG. 1, a dashpot with a fast idle device for automobile internal combustion engines is shown. A dashpot 2 of the dashpot with the fast idle device 1 functions to damp a rapid return of a throttle lever 3 of a carburetor 5 forced by a spring 14 and a fast idle device 4 makes a fast idling position of a throttle 7 through the dashpot 2 and the throttle lever 3, with vacuum induced from downstream of the throttle 7 through a conduit 9 with a solenoid valve 11 in response to a signal given when fast idle is required.

The dashpot with the fast idle device 1 comprises a central casing 13 which is cylindrical and has a partition 15, a diaphragm 17, a push rod 19 which is secured to the diaphragm 17 through retainers 21 and 23, a front casing 25 which is secured to the central casing 13 with an end portion 27 curled to press the periphery of the diaphragm 17 and has in its center a guide 29 for guiding the push rod 19, and a spring 120 disposed in an air chamber 31 defined by the diaphragm 17 and the central casing 13 so as to urge the push rod 19 to contact with the throttle lever 3. The retainer 23 is provided with an orifice 33 and a hole 36 for a check valve 35. The check valve 35 comprises the hole 36 and a part of the diaphragm 17 by which the hole 36 is chocked. A portion of the diaphragm 17 around the hole 36 is cut away except for a portion thereof left for holding the cut away portion so that the portion of the diaphragm 17 closes or opens the hole 36 according to the pressure in the air chamber 31.

The fast idling device 4 comprises the central casing 13, the partition 15, a diaphragm 37 defining a vacuum chamber 39 with the help of the rear portion of the central casing 13, which vacuum chamber 39 is connected to the conduit 9 with the solenoid valve 11, a rod 41 one end 40 of which is secured to the diaphragm 37 through retainers 43 and 45, the other end 42 is disposed in the air chamber 31 passing through a hole 47 made in the central portion of the partition 15 and has an annular groove 44, an end casing 49 with an air vent 51 which is secured to the central casing 13 thereby to put the periphery of the diaphragm 37 between both the casings 13 and 49, a spring 46 disposed between the partition 15 and the retainer 45 to urge the diaphragm 35 so as to expand the vacuum chamber 31, and a cup-shaped seal
} member 53 provided for sealing a gap 48 defined between the rod 41 and the partition 15 so as to surround the gap 48.

Figure 2A:
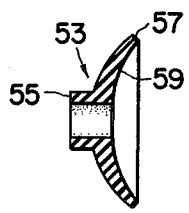
FIG. 2A is a section view showing the original shape of a seal member employed in FIG. 1.
Figure 2B:
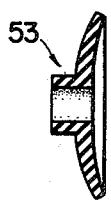
FIG. 2B is a section view showing an assembled form of the seal member in FIG. 2A.

The cup-shaped seal member 53 is made of resilient material such as rubber and formed as shown in FIG. 2A, that is, it comprises a bottom portion 55 which is formed in a cylindrical boss mounted on the annular groove 44 of the rod 41, a peripheral portion 57, and a partially spherical portion 59 spherically extending from the bottom portion 55 to the peripheral portion 57. The thickness of the partially spherical portion 59 becomes more thin toward the perpheral portion 57. Thus formed the cup-shaped seal member 53 is mounted as shown in FIG. 2B, that is, the cup-shaped seal member 53 is compressed by the partition 15 and the rod 41 to show a more flat shape shown in FIG. 2B.

In operation, when the throttle lever 3 is moved to open the throttle 7, the push rod 19 of the dashpot 2 is moved by the spring 20 to follow the throttle 7 with air entering the air chamber 31 by way of the orifice 33, and from the check valve 35 being opened in addition to from the orifice 33 at a rapid movement of the throttle lever 7. When the throttle lever 3 is returned by the spring 14, the movement of the throttle lever 3 is damped by the function of the dashpot 2 with the air in the air chamber 31 being discharged only from the orifice 33.

When the fast idle of the engine is required, the solenoid valve 11 is energized to open the vacuum passage of the conduit 9 and to close a passage communicating with the atmosphere, so that the rod 41 will be moved toward the push rod 19 to restrict the return movement of the push rod 19, whereby the throttle is positioned at an opening degree at which the engine run at fast idle. Increase of the vacuum in the vacuum chamber 39 brings about increase of pressure difference between the air chamber 31 and the vacuum chamber 39. By the increase of the pressure difference, the periphery 57 of the cup-shaped seal member 53 is pressed on the partition 15 more strongly thereby providing perfect sealing. The perfect sealing of the gap 48 makes the operation of the fast idle device 4 stable, further raises damping effect of the dashpot 2 because the air pressure in the dashpot 2 is influenced by the vacuum in the vacuum chamber 39 in case the sealing is poor.

When the fast idle is not required, the solenoid valve 11 is operated to close the passage of the conduit 9 and to open the passage so that the vacuum chamber 39 is raised in its pressure for the rod 41 to be restored to the original position. It is necessary that the cup-shaped seal member 53 is designed so that the periphery thereof will not be separated from the partition 15 when the maximum stroke of the rod 41 is brought about.

Another embodiment of the invention will be described hereunder in detail, referring to FIG. 3. This embodiment of the invention is the same as one shown in FIG. 1 except for some parts shown in FIG. 3 so that only the parts different from the abovementioned embodiment will be described.

Figure 3:
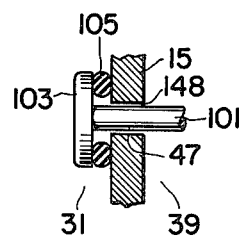
FIG. 3 is a section view of another embodiment of a seal member according to the invention

In FIG. 3, one end 103 of a rod 101 which is connected to the diaphragm 37 is disposed in the air chamber 31 and has a disc-shaped head 103, A ring 105 made of resilient material is disposed between and compressed by the disc-shaped head 103 and the partition 15. A gap 148 defined by the rod 101 and the partition 15 is surrounded by the ring 105 compressed so that vacuum in the vacuum chamber 39 is held. Increase of the difference of the pressure between in the vacuum chamber 39 and in the air chamber 31 causes ring diameter of the ring 105 to be small so that the ring 105 is compressed more strongly on the partition 15 to effect enough sealing of the gap 148.

Thus, the embodiments of the seal member each are simple in its construction and able to effectively seal the gap defined between the rod 41 or 101 and the partition 15 or wall of the vacuum chamber 39. Further because of the simple seal member 53 or 105, the dashpot with the fast idle device 1 can be easily assembled, that is, as for the seal member 53 or 105, it can be assembled only by insertion thereof into between the rod 41 or 101 and the partition 15.

It is noted that the seal member 53 or 105 is better to be adapted in apparatus employing the rod 41 or 101 which is used for small stroke.

What is claimed is:

1. A dashpot with a fast idle device for throttle valves comprising:
   a first expansible chamber having partition means which defines a part of said first expansible chamber;
   a second expansible chamber, a part of which is defined by said partition means;
   a push rod, a part of which is disposed in and mechanically connected to said first expansible chamber to axially move according to movement of said first expansible chamber, another part of which is disposed in said second expansible chamber, passing through a hole made in said partition means;
   a resilient seal member disposed in said second expansible chamber and including a first portion airtightly engaging with said push rod, a second portion surrounding a gap defined by said push rod passing through said hole and the inner wall of said hole of said partition means and airtightly contacting with said partition means to seal said gap, and a third portion extending from said first portion to said second portion and having a shape such that said second portion is pressed more tightly on said partition means as the pressure difference between said first and second expansible chamber increases;
   means secured to said second expansible chamber for actuating a throttle valve, said actuating means facing said push rod and being intermittently pushed thereby;
   an air passage means for communicating said second chamber to atmosphere, said air passage means providing relatively small passage resistance when said second expansible chamber is expanding, and providing larger passage resistance when said second expansible chamber is shrinking, thereby effecting dashpot function; and
   means for selectively introducing vacuum into said first expansible chamber.

2. The dashpot with the fast idle device according to claim 1, wherein the resilient seal member is a ring made of rubber and disposed between and pressed by the wall and a flange radially extending from the end of the rod pressed.

3. The dashpot with the fast idle device according to claim 1, wherein the third portion of the resilient seal member has in its original shape a generally partially spherical shape such that the diameter of the spherical shape increases toward the second portion.

4. The dashpot with the fast idle device according to claim 3, wherein the thickness of the third portion of the resilient seal member is decreased toward the second portion.

5. The dashpot with the fast idle device according to claim 3, wherein the rod has an annular groove at the portion of the engagement with the resilent seal member, and the resilient seal member has at the first portion an cylindrical boss which is inserted in the annular groove of the rod.

6. A dashpot with a fast idle device for throttle valves comprising:
   a cylindrical casing having a partition wall with a hole thereby radially dividing the interior of the cylindrical casing into two spaces;
   a first diaphragm the periphery of which is airtightly secured to one end portion of the cylindrical casing thereby providing a vacuum chamber defined by the cylindrical portion, the partition wall, and the first diaphragm;
   a second diaphragm the periphery of which is airtightly secured to the other end of the cylindrical casing thereby providing an air chamber defined by the other part of the cylindrical casing, the partition wall, and the second diaphragm, the air chamber having small passage means and check valve means to provide the dashpot;
   a rod for fast idle one end of which is secured to the first diaphragm, the other is disposed in the air chamber, passing through the hole of the partition wall;
   a first spring disposed in the vacuum chamber to urge the first diaphragm so as to expand the vacuum chamber;
   a second spring disposed in the air chamber to urge the second diaphragm so as to expand the air chamber;
   a push rod secured to the second diaphragm and one end of which is disposed to oppose the end of the rod disposed in the air chamber, the other end opposing a lever for actuating the throttle;
   a resilient seal member disposed in the air chamber for sealing a gap defined between the rod and the partition wall and including a first portion airtightly engaging with the rod so that the first portion will move in conformity with the axial movement of the rod, a second portion disposed around the gap and tightly contacting with the partition wall, and a third portion extending from the first portion to the second portion and having a shape such that the second portion is pressed on the partition wall more tightly as the pressure difference between the vacuum chamber and the air chamber increases; and
   means for introducing vacuum into the vacuum chamber when the fast idle is required.

7. The dashpot with the fast idle device according to claim 6, wherein the resilient seal member is formed in a ring, and disposed between and pressed by the partition wall and a flange radially extending from the end of the rod.

8. The dashpot with the fast idle device according to claim 6, wherein the third portion has in its original shape a generally partially spherical shape such that the diameter of the shape increases toward the second portion.

9. The dashpot with the fast idle device according to claim 8, wherein the third portion of the resilient seal member decreases in its thickness toward the second portion.

10. The dashpot with the fast idle device according to claim 9, wherein the rod has an annular groove at its end portion disposed in the air chamber, and the resilient seal member has an annular boss inserted in the annular groove of the rod.

11. The dashpot with the fast idle device according to claim 10, wherein the seal member is made in the shape of a cup.

* * * * *